US009558446B2

(12) United States Patent
Koenig

(10) Patent No.: US 9,558,446 B2
(45) Date of Patent: Jan. 31, 2017

(54) METHOD FOR PLANNING TRIPS TO TRANSPORT PASSENGERS

(75) Inventor: Georg Koenig, Waldbronn (DE)

(73) Assignee: INIT INNOVATIVE INFORMATIKANWENDUNGEN IN TRANSPORT-, VERKEHRS-UND LEITSYSTEMEN GMBH, Karlsruhe (DE)

(*) Notice: Subject to any disclaimer, the term of this patent is extended or adjusted under 35 U.S.C. 154(b) by 256 days.

(21) Appl. No.: 13/983,730

(22) PCT Filed: Dec. 5, 2011

(86) PCT No.: PCT/DE2011/050051
§ 371 (c)(1),
(2), (4) Date: Aug. 5, 2013

(87) PCT Pub. No.: WO2012/107008
PCT Pub. Date: Aug. 16, 2012

(65) Prior Publication Data
US 2013/0311418 A1 Nov. 21, 2013

(30) Foreign Application Priority Data

Feb. 11, 2011 (DE) .................. 10 2011 011 062

(51) Int. Cl.
G06N 5/02 (2006.01)
G06Q 10/04 (2012.01)
G08G 1/01 (2006.01)

(52) U.S. Cl.
CPC .............. G06N 5/02 (2013.01); G06Q 10/047 (2013.01); G08G 1/012 (2013.01); G08G 1/0112 (2013.01);

(Continued)

(58) Field of Classification Search
None
See application file for complete search history.

(56) References Cited

U.S. PATENT DOCUMENTS

2003/0187720 A1* 10/2003 Takada ........................ 705/10
2006/0030990 A1 2/2006 Anderson et al.
(Continued)

FOREIGN PATENT DOCUMENTS

DE 10139668 A1 2/2003
EP 0720137 A2 7/1996
(Continued)

OTHER PUBLICATIONS

The International Bureau of WIPO, International Preliminary Report on Patentability, including translation of the International Searching Authority's Written Opinion, for International Application No. PCT/DE2011/050051, issued Aug. 13, 2013, 6 pages, Switzerland.

(Continued)

Primary Examiner — Kakali Chaki
Assistant Examiner — Michael Zidanic
(74) Attorney, Agent, or Firm — Alston & Bird LLP

(57) ABSTRACT

A method for planning trips to transport passengers on the basis of a preferably statistical predictive model, in particular to plan capacities, optimize the utilization of vehicle fleets, determine the routes to be taken, etc., preferably in short-distance passenger traffic, wherein the predictive model takes into account, using parameters, characteristic passenger patterns over the course of a day, week, and/or year, is characterized in that the predictive model additionally uses weather-specific parameters.

11 Claims, 2 Drawing Sheets

Figure 1:
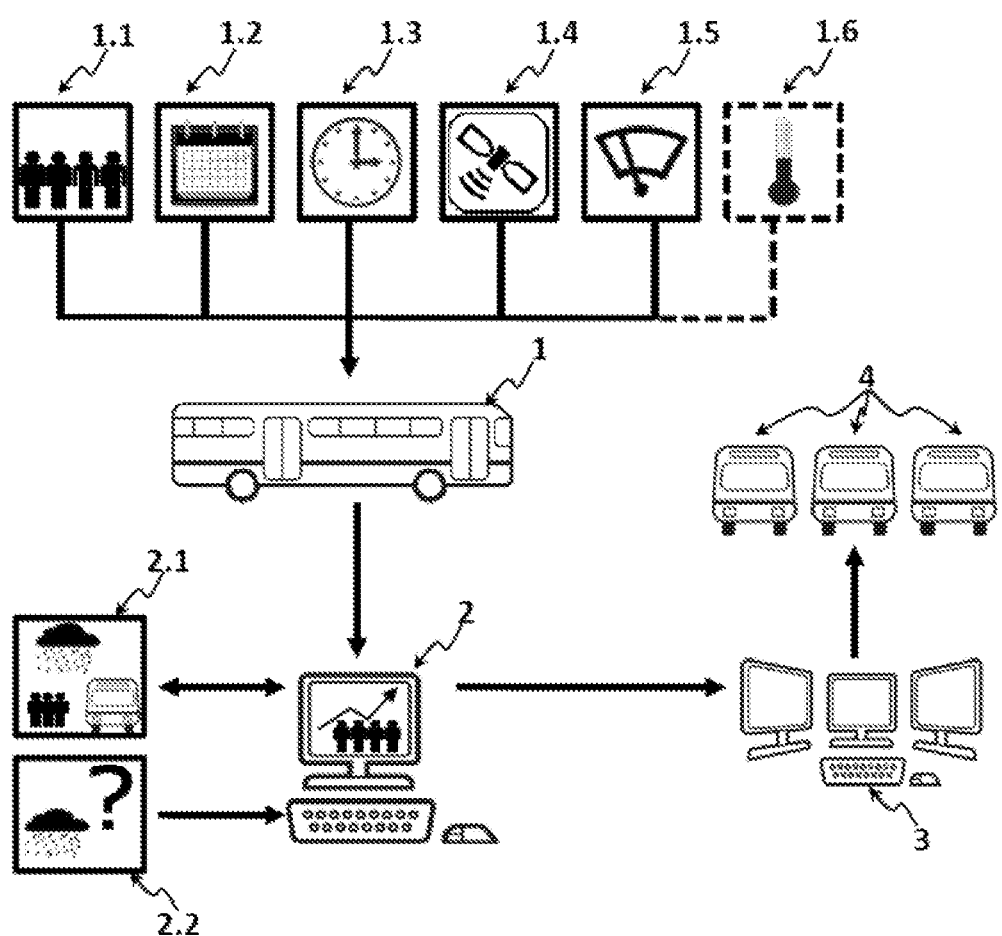

(52) U.S. Cl.
CPC ........... *G08G 1/0116* (2013.01); *G08G 1/0129* (2013.01); *G08G 1/0137* (2013.01)

(56) References Cited

U.S. PATENT DOCUMENTS

| | | |
|---|---|---|
| 2008/0030370 A1 | 2/2008 | Doyle |
| 2009/0259360 A1 | 10/2009 | Petricoin, Jr. |
| 2010/0185486 A1* | 7/2010 | Barker ............... G06Q 30/0202 705/7.31 |
| 2011/0029243 A1* | 2/2011 | Gallagher ............... G01W 1/00 702/3 |
| 2012/0173136 A1* | 7/2012 | Ghoting ................ G08G 1/202 701/411 |

FOREIGN PATENT DOCUMENTS

| | | |
|---|---|---|
| EP | 0994449 A2 | 4/2000 |
| WO | WO 96/24108 A1 | 8/1996 |

OTHER PUBLICATIONS

"Framework Specification: Automatic Passenger Counting Systems (APCS)", VDV Schriften No. 457, Nov. 2006, Verbrand Deutscher Verkehrsunternehmen (VDV), Germany.

"Automatic Passenger Counting Systems in Rail Transport", VDV Schriften No. 458, Nov. 2008, Verbrand Deutscher Verkehrsunternehemen (VDV), Germany.

International Searching Authority, International Search Report ("ISR") and Written Opinion for International Application No. PCT/DE2011/050051, mailed Jun. 6, 2012, 12 pages, European Patent Office, The Netherlands.

Drobot, Sheldon, et al., "Using Vehicles as Mobile Weather Platforms," *Data and Mobility Advances in Intelligent and Soft Computing*, 2010, pp. 203-213, vol. 81, Springer-Verlag, Germany.

Haberlandt, U., et al., "Areal Rainfall Estimation Using Moving Cars as Rain Gauges—A Modelling Study," *Hydrology and Earth System Sciences*, Jul. 2, 2010, pp. 1139-1151, vol. 14, Copernicus Publications, Germany.

* cited by examiner

METHOD FOR PLANNING TRIPS TO TRANSPORT PASSENGERS

CROSS REFERENCE TO RELATED APPLICATIONS

This application is a national stage application, filed under 35 U.S.C. §371, of International Application No. PCT/DE2011/050051, filed Dec. 5, 2011, which claims priority to and the benefit of German Application No. 10 2011 011 062.3, filed Feb. 11, 2011, the contents of both of which are hereby incorporated by reference in their entirety.

BACKGROUND

Technical Field

The invention relates to a method for the planning of trips in the transport of persons, based on a preferably statistical forecasting model, particularly for the purpose of capacity planning, for the purpose of optimizing the deployment of vehicle fleets, for the purpose of planning test runs, etc., preferably in the regional transit of persons, wherein the forecasting model takes into account the behavior of passengers over a profile of days, weeks, and/or years, via parameters.

This is basically a planning method for the purpose of controlling vehicle fleets in the regional transit of persons, wherein the method can also be used for planning test runs, by way of example. It does not matter whether the passenger transit takes places by road or by rail. In principle, the method can be used in the planning of any manner of passenger transit.

Description of Related Art

In practice, the classical approach is known wherein the number of passengers is detected, and the degree of usage—of what is most commonly public regional passenger transit—is determined in correlation with the line, the time, the day of the week, and the type of day—weekday, holiday, etc. The detection of entering and exiting passengers is carried out in automatic passenger counting via sensors in the vehicle doors, which continuously determine the degree of usage of each vehicle. For cost reasons, the amount of technology which must be deployed for this purpose is only used in a few vehicles of the vehicle fleet, by many transit operators, such that it is necessary to use the accordingly equipped counting vehicles specifically on the lines/circuits which are suitable to serve as the basis of calculations of required capacity using statistical models. The determination of routes which will be operated—also called test run planning—is very important for precisely specifying samples, particularly for the purpose of establishing a basis for a forecasting model for extrapolating a route network. The samples take into account the layering of process parameters, different types of times of day (holidays, weekdays, weekends), lines, and also sample sizes.

In current practice, a wide variety of forecasting models are known. The Association of German Transport Companies (VDV) presents, in the VDV Magazine No. 457, printed November 2006, under "Rahmenlastenheft [Framework Specifications Sheet]" automatic passenger counting systems, statistical foundations, notes, and recommendations. Information on passenger counting systems in rail transport is known from the Magazine No. 458, printed on November 2008. The recommendations of VDV are based on the considerations given above.

The forecasting models implemented to date approximate the actual conditions according to underlying basic parameters. Even though essential parameters are in fact taken into account, the quality of the forecasts is subject to enormous variations in the passenger occupancy, and particularly over the entire year. In particular, variability occurs when the weather affects the behavior of passengers. The statistical models are significantly skewed as a result. As a result, the number of planning parameters used to date is not adequate for representative samples. When the recommendations issued by the VDV are followed as closely as possible, the forecasts deviate from the real situation, at the latest, when unforeseeable weather changes have a drastic effect on the behavior of passengers.

BRIEF SUMMARY

The invention addresses the problem of improving the forecasting models known to date with respect to the relevant parameters. In the process, outliers must be eliminated in test runs. The method should improve passenger statistical models, thereby making it possible to optimize the use of vehicle fleets.

The problem above is addressed by a method having the features of claim 1. This method is characterized in that the forecasting model uses further parameters in addition to the parameters used to date—particularly weather-specific parameters.

It was been discovered according to the invention that the forecasting models used to date leave out relevant parameters. While the parameters used to date, such as passenger count, date, time, and position lead to enormous value variations in the calculated forecast, according to the invention at least one weather-specific parameter is used which is included in the forecasting model.

In the simplest case, the weather specific parameters can be information relating to wet weather or precipitation, wherein for precipitation a differentiation must be made between rain and snow, and optionally hail. When taking into account the weather specific parameters, it is possible to include systematic disruptions in the forecasting model, and particularly while simultaneously eliminating stochastic disruptions.

According to the method according to the invention, the general weather conditions are taken into account, as determined according to the invention, which particularly have a large influence on the behavior of passengers. At the same time, it is possible to eliminate stochastic influences, such as sudden rain showers during test runs, wherein in no way is it possible to derive the basic behavior of passengers from the same.

The weather specific parameters also include the strength of the precipitation and optionally a predicted duration of the precipitation. The parameters relating to the precipitation can be determined from the current weather report at any given time.

In a particularly simple manner, it is possible to determine the precipitation via a sensor system on the vehicle, in a configuration wherein the vehicles are particularly outfitted with rain sensors and the data thereof is incorporated into the forecasting model.

In an astoundingly simple manner, the actuation of the windshield wipers can be detected, in place of using a separate sensor system, wherein said wipers can be used as rain sensors according to their operation.

The weather specific parameters can include farther-reaching information related to road conditions, particularly including black ice. As an alternative or in addition thereto, the outside temperature can be measured directly at the vehicle, particularly via simple temperature sensors and/or thermometers. In combination with the actuation of the windshield wipers, it is possible to predict simple rain at temperatures over 0° C., and a risk of black ice at temperatures significantly below 0° C., such that it is possible to derive composite parameters from the sensors.

In a particularly advantageous manner, the data detected on or in the vehicle are transmitted via radio, UMTS, WLAN, or the like to a central computer which is used for the purpose of calculating the forecasting model and/or the forecast, and finally for the purpose of planning/controlling vehicle fleets. It is not only possible to plan transport capacities or test runs via the forecasting model which incorporates weather specific parameters; rather, it is also possible to make a simulation extending over seasons, thereby making an optimized capacity planning possible, incorporating various relevant parameters, even taking into account the history of past weeks, months, and years.

DETAILED DESCRIPTION OF THE DRAWINGS

Figure 2:
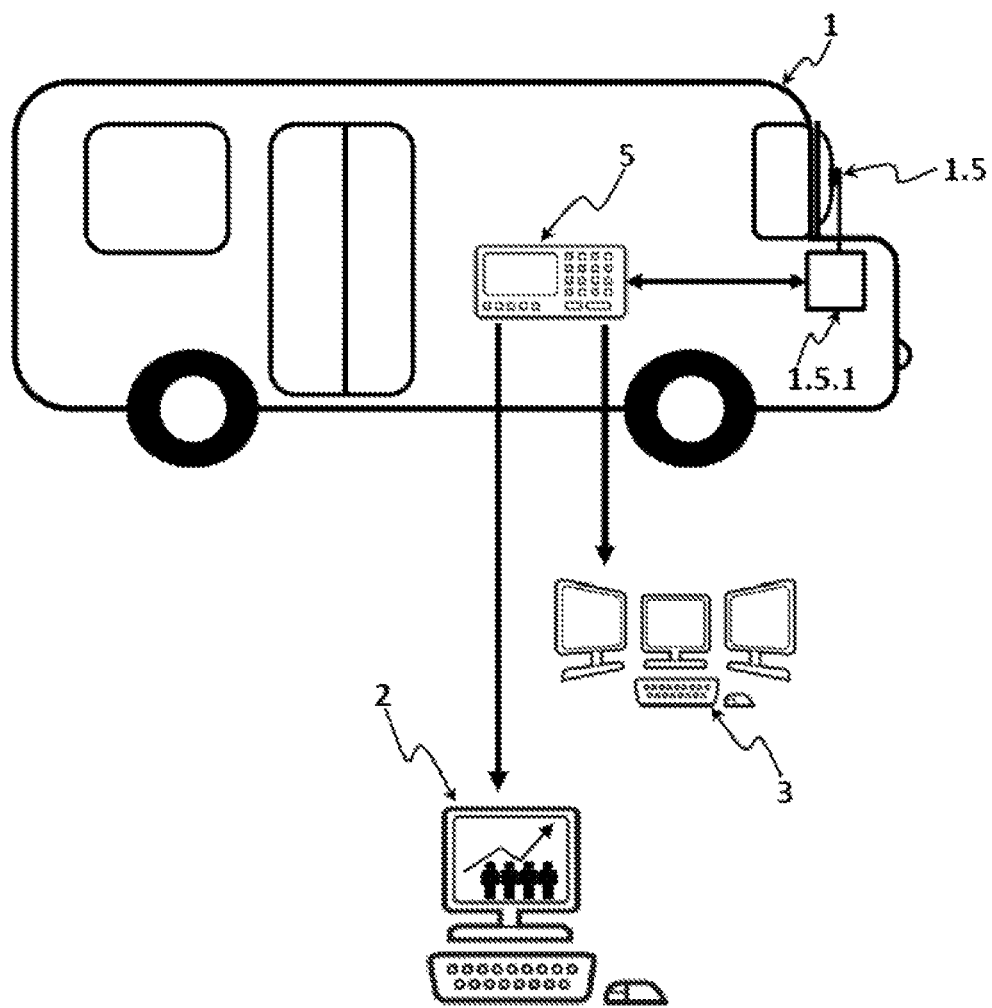

At this point, there are various options for embodying and implementing the teaching of the present invention in an advantageous manner. For this purpose, reference is hereby made first to the claims dependent on claim 1, and second to the following description of a preferred embodiment of the invention and to the drawings. In the context of the explanation of the preferred embodiment of the invention and of the drawing, other generally preferred embodiments and implementations of the teaching are explained as well, wherein:

FIG. 1 shows a schematic view of the method according to the invention based on a suitable forecasting scheme, and FIG. 2 shows a schematic view of the collection of parameters directly at the vehicle, and the incorporation of the parameters in a central computer system in which the forecasting model is processed.

DETAILED DESCRIPTION OF VARIOUS EMBODIMENTS

FIG. 1 shows a schematic illustration, in the manner of a block diagram, of how the forecasting model works. Based on the detected passenger count 1.1, the date 1.2, the time 1.3, the data of the GPS 1.4, and the state of the windshield wiper 1.5, the same being able to be detected and/or determined electronically, it is possible to compile a forecast, optionally while also incorporating the outside temperature 1.6 in reference to a concrete vehicle 1 or to a vehicle fleet 4, wherein this forecast is calculated by a suitable forecasting program 2. The forecasting program 2 runs on a central computer, wherein the data determined in and/or on the vehicle 1 is transmitted to the central computer by radio.

The vehicle 1 illustrated in FIG. 1 is a test run vehicle which serves the purpose of obtaining the data and/or parameters 1.1 to 1.6. The vehicle fleet 4 is controlled by the forecasting program 2 via a computer-aided operations control system 3.

In other words, a forecast is calculated via a test run vehicle 1, said forecast being complemented by the systematic deviation in periods of rain or the like, wherein the history 2.1 and the general weather forecast 2.2 can be optionally incorporated as well.

The result of the forecast is relayed to the computer-aided operations control system 3, and provides the controller with the decisive information for deploying the vehicle fleet 4.

The real-time and/or on-time detection of the outside temperature is of particularly high importance, said outside temperature being indicated in FIG. 1 by the reference number 1.6. The additional or alternative detection of the outside temperature is illustrated by a dashed line.

It is particularly important to emphasize at this point that it is possible to determine snowfall, black ice, or a wet road from the parameters for rain/dry in combination with the temperature. By means of combining the two parameters, it is possible to yet again increase the reliability of the forecast.

FIG. 2 shows a schematic view of the test run vehicle 1 which is equipped with a windshield wiper 1.5. As soon as the windshield wiper 1.5.1 is activated, this status is relayed to an on-board computer 5, and from there is transmitted, preferably by radio, to the forecasting program 2 and/or directly to the operations control system 3 scheduling function.

In light of the above embodiments, it is clear that an improved forecasting method/forecasting system is realized, in an advantageous manner, wherein the forecast of the vehicle deployment for vehicle fleets, for the purpose of passenger transport, not only takes into account the parameters which have been conventional to date, such as passenger count, date, time, and position, but also takes into account the weather conditions. Just as before, the basis for reliable forecasts are repeated test runs, wherein it is possible to eliminate stochastic disturbance values by incorporating the weather data. This is carried out in a simple manner in that the operating state of the windshield wiper is detected for the purpose of detecting rain, and in combination with the detected outside temperature, it is possible to make concrete conclusions about the weather. Corresponding parameters are supplied to the forecasting program.

As regards further advantageous embodiments of the device according to the invention, reference is hereby made for the purpose of avoiding repetition to the general portion of the description and to the attached claims.

Finally, it is hereby expressly stated that the embodiments of the method according to the invention described above only serve to explain the claimed teaching, and the teaching is not restricted to the embodiments.

LIST OF REFERENCE NUMBERS 3 vehicle
1.1 passenger count
3.2 date
3.3 time
3.4 GPS data
3.5 windshield wiper
1.5.1 windshield wiper motor
3.6 outside temperature
4 forecasting program
2.3 history
2.4 weather forecast
3 operations control system
4 vehicle fleet
5 on-board computer

The invention claimed is:

1. A method of capacity planning for planning trips to transport passengers, said method being based on a statistical forecasting model provided via a forecasting program running on a central computer containing one or more processors for the purpose of optimizing the deployment of vehicle fleets and for the purpose of planning test drives, wherein the method comprises the steps of:

accounting for, via execution of the forecasting program by the one or more processors, one or more parameters associated with the behavior of passengers over a profile of at least one of a period of days, weeks, or years so as to provide a plurality of repeated test runs, wherein the one or more parameters comprise one or more weather specific parameters associated with information relating to precipitation and an outside temperature;

determining the precipitation via a sensor system on the vehicle, wherein actuation of a windshield wiper on at least one vehicle in the vehicle fleet serves as the sensor system;

measuring the outside temperature at the at least one vehicle and using the measured temperature to at least, in part, determine the nature of the precipitation detected via the sensor system;

transmitting data detected at the vehicle to the central computer for incorporation into the statistical program; and initiating an optimized deployment of vehicle fleets based at least in part upon said data from the plurality of repeated test runs being incorporated into the statistical forecasting model and via automatic execution of said forecasting program by said one or more computer processors, the optimizing occurring prior to the deployment of the vehicle fleets and eliminating stochastic disturbance values due to the incorporation of the one or more weather specific parameters.

2. A method according to claim 1, wherein said optimized deployment of vehicle fleets facilitates regional transit of passengers.

3. A method according to claim 1, wherein the one or more weather specific parameters are further associated with information relating to dry weather.

4. A method according to claim 1, wherein the precipitation is at least one of rain or snow.

5. A method according to claim 1, wherein the one or more weather specific parameters comprise the strength of the precipitation.

6. A method according to claim 5, wherein the one or more weather specific parameters further comprise a forecast duration of the precipitation.

7. A method according to claim 1, wherein the parameter relating to the precipitation is determined via data from the current relevant weather report.

8. A method according to claim 1, wherein the weather specific parameters further include information relating to the road conditions, particularly with respect to black ice.

9. A method according to claim 8, wherein the information relating to the road conditions comprises information relating to black ice conditions.

10. A method according to claim 3, wherein the transmission of data to the central computer is via at least one of radio or WLAN.

11. A method according to claim 1, wherein the forecasting model uses probabilities for weather specific parameters, taking into account the history.

* * * * *